United States Patent [19]

Ing et al.

[11] Patent Number: 6,059,557

[45] Date of Patent: May 9, 2000

[54] COOLING DEVICE ATTACHED TO INDEX MACHINE

[75] Inventors: Ronald Ing, Etobicoke; William Jacovich, Newmarket; John Galt, Nobleton; Jacques Bourque, Alliston; Robert Ilmonen, North York, all of Canada

[73] Assignee: Husky Injection Molding Systems Ltd., Canada

[21] Appl. No.: 09/167,699

[22] Filed: Oct. 7, 1998

[51] Int. Cl.[7] .................................................. B29C 45/73
[52] U.S. Cl. ........................... 425/552; 264/334; 425/556
[58] Field of Search .................................... 425/556, 441, 425/443, 444, 436 RM, 572, 576, 547, 552; 264/334

[56] References Cited

U.S. PATENT DOCUMENTS

Re. 33,237  6/1990  Delfer, III ................................ 425/556
4,729,732  3/1988  Schad et al. .............................. 425/526
5,728,409  3/1998  Schad et al. .............................. 425/130

*Primary Examiner*—Tim Heitbrink
*Attorney, Agent, or Firm*—Bachman & LaPointe, P.C.

[57] ABSTRACT

The present invention relates to a cooling device to be used with an index molding machine having a rotary turret block with at least two movable mold halves thereon. The cooling device includes a frame attached to a support for the rotary turret block, cooling tubes for receiving and cooling at least one molded part, which cooling tubes are mounted to a surface of a carrier plate connected to the frame, and an actuation device for moving the carrier plate between a first orientation where the cooling tubes are aligned with the at least one molded part and a second orientation where the at least one molded part cooled within the cooling tubes. In a preferred embodiment of the present invention, the cooling device also includes at least one blowing tube for blowing cool air onto the at least one molded part.

48 Claims, 13 Drawing Sheets

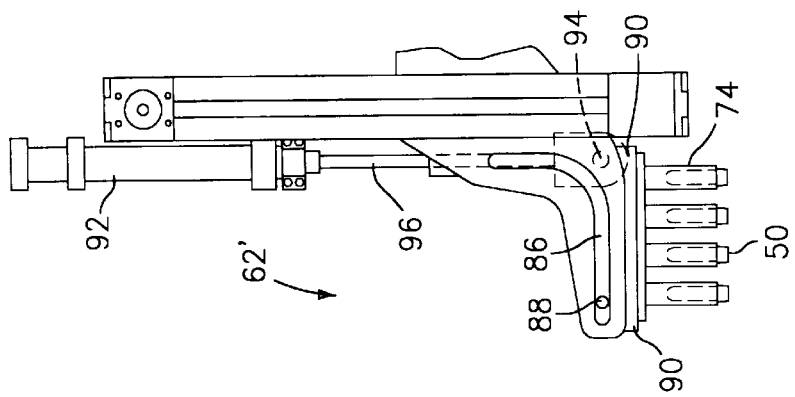
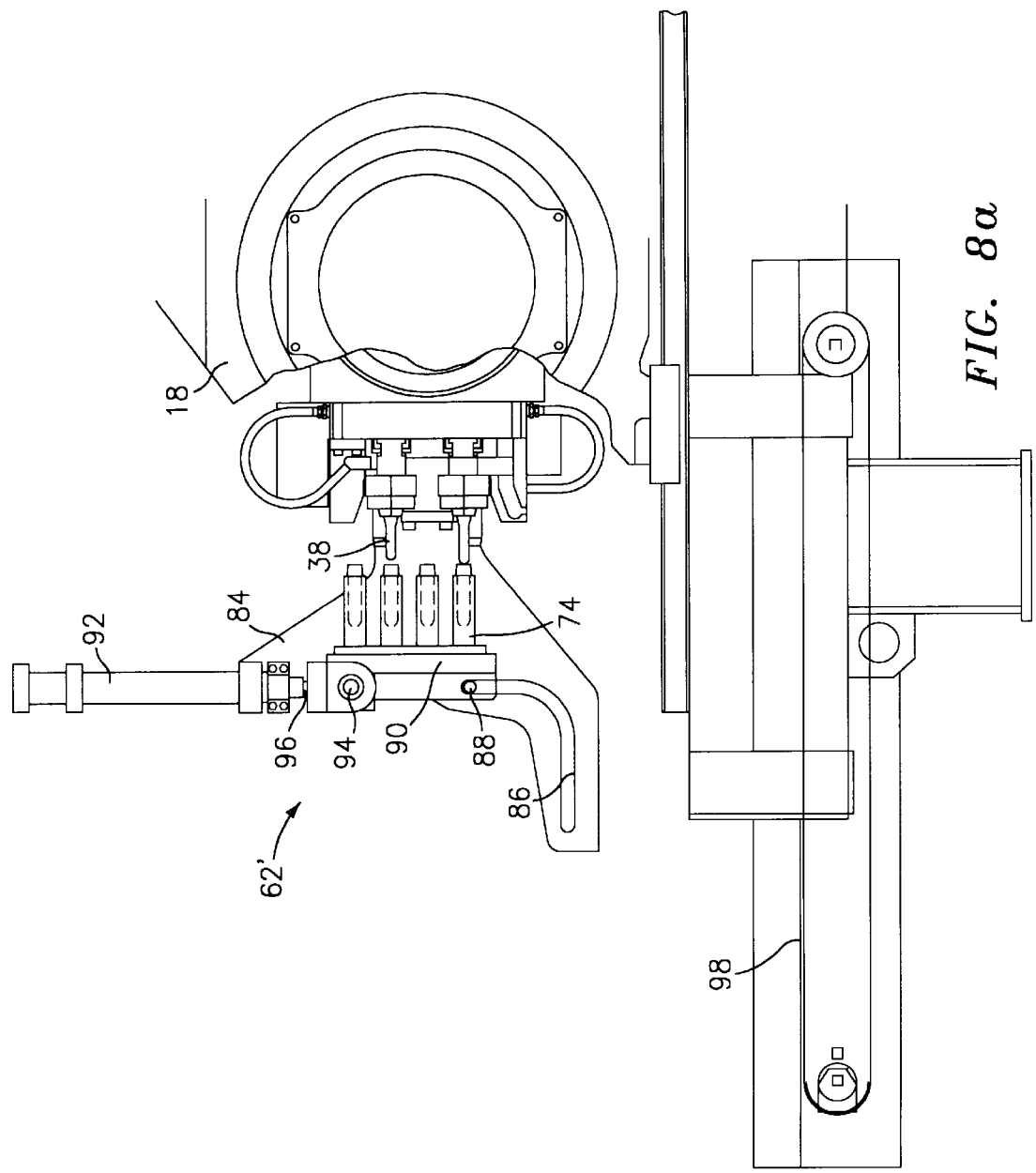

COOLING DEVICE ATTACHED TO INDEX MACHINE

BACKGROUND OF THE INVENTION

The present invention relates to an improved molding machine, in particular, a two faced index molding machine, having improved part cooling and part removal.

Index molding machines are known in the art. U.S. Pat. No. 5,728,409, assigned to the assignee of the instant application, shows a four faced turret block with a temperature conditioning station mounted to the turret for directing cooling air onto newly molded articles and a tubular part removal system using an air conveyor. Currently, there is a need for a lower cost molding machine which employs only a two faced turret block and correspondingly half the number of core sets of tooling.

Co-pending, allowed U.S. patent application Ser. No. 08/847,895 to Arnott et al., entitled Injection Molding Machine Having a High Speed Turret, filed Apr. 28, 1997, also assigned to the assignee of the instant application, shows an index molding machine with a two faced turret block. This application however does not discuss the problems of part cooling and controlled part removal.

Co-pending U.S. patent application Serial No. 09/070,598, to Galt et al., filed Apr. 30, 1998, entitled Tiebar Structure for Injection Molding Machine, also assigned to the assignee of the instant application, shows a two tiebar index molding machine. Here again, there is no discussion of part cooling or part removal.

U.S. Pat. No. 4,729,732 and U.S. Reissue Pat. No. 33,237, both assigned to the assignee of the instant application, show a multi-position tooling plate with water cooled tubes used to remove and cool preforms from a conventional preform molding machine. The tooling plate design shown in these patents has two disadvantages. First, the robot mechanism occupies a substantial floor area adjacent the machine. Second, the preforms are cooled inside their tubes in a horizontal orientation. This has been found to be detrimental in that the weight of the preform causes it to press more firmly against the lower portion of the cooling tube while its upper surface tends to separate from the upper portion of the cooling tube. This unequal contact force with the cooling surface tends to promote unequal cooling of the preform from one side to the other. A vertical orientation during cooling provides a symmetrical weight distribution with a balanced heat removal result.

Conventional index molding machines eject parts at the lowermost station, i.e., when the molded parts to be ejected are under the turret block. There is a need to accommodate part ejection/removal at a station opposite to the molding station to permit two faced turret operation in a molding cycle where the turret rotates 180 degrees each time the mold opens instead of rotating 90 degrees at each mold opening.

SUMMARY OF THE INVENTION

Accordingly, it is an object of the present invention to provide a two faced turret molding machine having improved part cooling and improved part removal.

It is a further object of the present invention to provide a molding machine as above which is less expensive to produce.

It is yet a further object of the present invention to provide a molding machine as above which allows cooling of the molded part in a vertical orientation.

The foregoing objects are achieved by the molding machine, the cooling device, and the process of the present invention.

In accordance with the present invention, there is provided a cooling device for use with an index molding machine having a rotary turret block mounted within support means and at least one mold core on each of at least two faces of said rotary turret block. The cooling device broadly comprises frame means attached to said rotary turret block support means, means for receiving and cooling at least one molded part, said receiving and cooling means being mounted to a first surface of a carrier plate connected to said frame means, and means for moving said carrier plate between a first orientation where said receiving and cooling means is aligned with said at least one molded part and a second orientation where said at least one molded part is preferably vertically oriented while being cooled within said receiving and cooling means.

The process of the present invention broadly comprises the steps of providing an index molding machine having a first platen carrying a first mold half having at least one mold cavity and a second platen comprising rotatable turret block means rotatable on a central axis of rotation for rotating at least two movable mold halves into alignment with the first mold half, each of the movable mold halves having at least one mold core, moving the rotatable turret block means to bring a first one of said movable mold halves into a mold closed position with said first mold half and clamping the first one of the movable mold halves and the first mold half, injecting molten material into the at least one mold cavity to form a first molded part set comprising at least one molded part, holding the first one of the movable mold halves in the mold closed and clamped position while cooling the first molded part set, moving the rotatable turret block means to a mold open position where the first set is positioned on the at least one mold core on the first one of the movable mold halves, rotating the turret block to bring the first molded part set to a cooling position, providing a cooling device on a carrier plate adjacent said cooling position, said cooling device having at least one cooling tube for receiving the first molded part set into the at least one cooling tube, rotating said at least one cooling tube to a position where each said molded part in said first set is in a desired orientation, preferably vertically, and cooling each said molded part in the first set while it is in said desired orientation. The process further comprises forming a second set of molded part(s) on mold core(s) on a second one of the movable mold halves while the molded part(s) in the first set is being cooled and thereafter rotating the rotatable turret block so that said second set of molded part(s) is in said cooling position and subjecting the second set of molded part(s) to cooling.

Other details of the molding machine, cooling device, and the process of the present invention, as well as other objects and advantages attendant thereto, are set forth in the following detailed description and the accompanying drawings wherein like reference numerals depict like elements.

BRIEF DESCRIPTION OF THE DRAWINGS

FIG. 1b is an end view of the molding machine of FIG. 1a;

FIG. 3 is a partial sectional view of the molding machine of FIG. 1a;

FIG. 4 is a partial sectional view of the molding machine of FIG. 1a;

FIG. 7 is a chart showing the sequence of operation of the molding machine of FIG. 1a;

FIGS. 8a and 8b illustrate an alternative embodiment of a cooling device having multi-position cooling tubes for use with an index molding machine;

DETAILED DESCRIPTION OF THE PREFERRED EMBODIMENT(S)

Figure 1A:
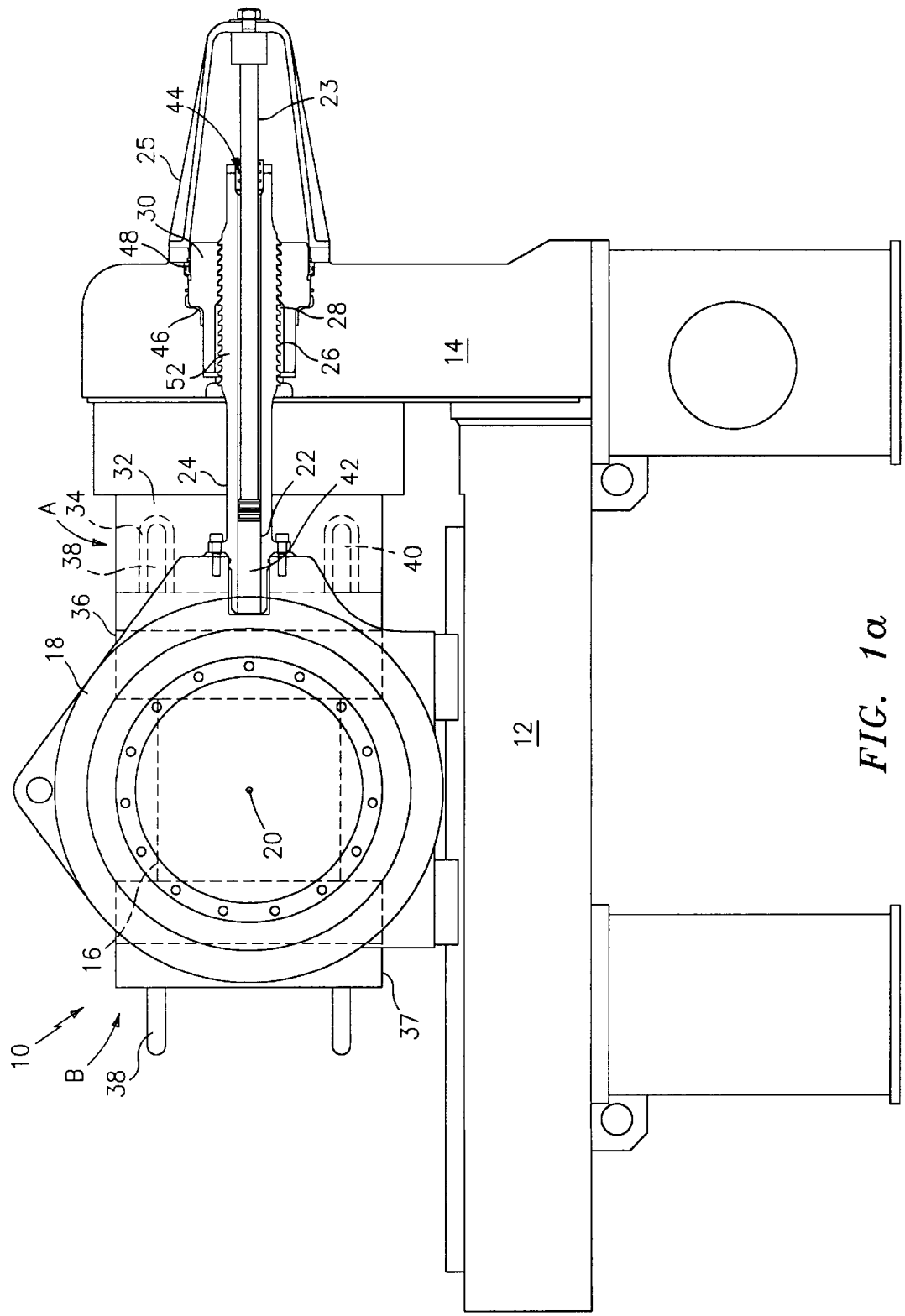
FIG. 1a is a side view of a two tiebar index molding machine.
Figure 1B:
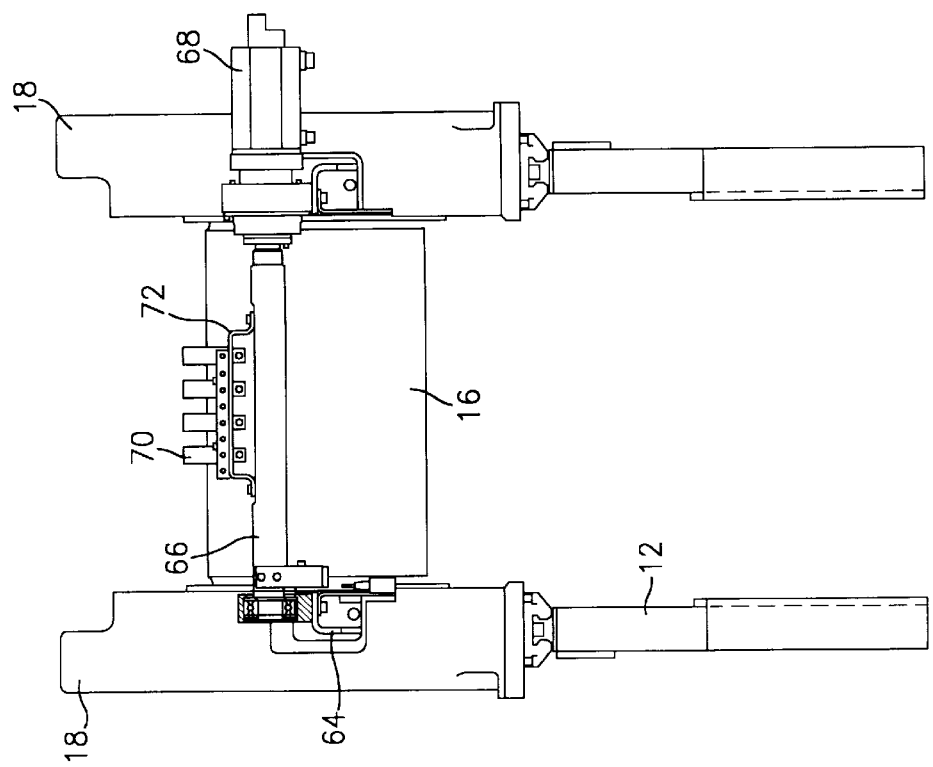

Referring now to the drawings, FIGS. 1a and 1b illustrate a two tiebar index molding machine 10 of the type shown in co-pending U.S. patent application Ser. No. 09/070,598, to Galt et al., entitled Tiebar Structure for Injection Molding Machine, filed Apr. 30, 1998, which is incorporated by reference herein. The index molding machine 10 includes a base 12, a fixed platen 14, and a movable platen 16 which is movable with respect to the fixed platen 14. The movable platen 16 is a two-faced rotary turret block, which is positioned within the movable platen, with pinions in bearings mounted in carriers 18 that slide on the base 12. The turret block 16 is rotated or indexed on a central axis 20 so that the faces thereof represent two positions in an injection molding cycle. Thus, the rotatable turret block 16 is rotatable on a central axis of rotation 20 for rotating a plurality of movable mold halves 36 attached thereto into alignment with a first mold half 32 carried by the fixed platen 14. Each movable mold half 36 includes at least one mold core 38 and is matable with the first mold half 32 for forming a mold for forming at least one molded article, with the mold halves being clamped together as will be described hereinafter.

The first mold half 32 may be joined to the fixed platen 14 in any suitable manner known in the art and may contain one or more mold cavities 34 which together with the mold core(s) 38 form one or more mold cavity spaces 40. Parts 50, such as preforms, are molded by injecting plastic material through the mold half 32 from an injection unit (not shown) into the cavity space(s) 40 formed by the closed mold.

Two tiebars 24 are provided and bolted to the carriers 18, each of which includes an inside stroke cylinder 22, the rod 23 of which is fixed to housing 25 which in turn is bolted to fixed platen 14. Each tiebar 24 includes external teeth 26 of a rotating clamp piston 30 with the clamp piston contained in fixed platen 14. The clamp piston 30 includes a row of teeth 28 and an adjacent row free from teeth so that on rotation of the clamp piston, the clamp piston teeth 28 alternately engage and disengage the tiebar teeth 26. Clamp piston 30 may be rotated by any desired and convenient means (not shown), such as a cylinder means acting on a pin via a slot in housing 25, such as a cylinder bolted to the fixed platen 14 with linkage means connecting the pins together and causing rotation of the pistons 30.

In operation, a pin (not shown) rotates clamp piston 30 so that clamp piston teeth 28 are disengaged from teeth 26 on tiebars 24. High pressure oil is then supplied to the piston end 42 of stroke cylinder 22 via a line (not shown) causing stroke cylinder rod 23 to extend and move carriers 18 and turret block 16 away from the fixed platen 14, thereby opening the mold. In order to close the mold, oil is supplied to the rod side 44 of stroke cylinder 22 via a line (not shown), thereby retracting stroke cylinder rod 23 and closing the clamp until the mold is closed. The aforementioned pin (not shown) is then activated by a cylinder (not shown) and linkage means (not shown) to engage clamp piston teeth 28 with tiebar teeth 26. High pressure oil is then provided to the clamp piston cylinder 46 causing the clamp pistons to clamp the mold. After molding, high pressure oil is provided to the mold break cylinder 48 causing clamp piston 30 to act on the back side of tiebar teeth 26 and urge the mold open. After a short stroke, clamp piston 30 is de-energized and the pin actuated by the aforementioned cylinder and linkage means causes the clamp piston to rotate to disengage clamp piston teeth 28 from tiebar teeth 26 so that stroke cylinder 22 can open the mold.

As shown in FIG. 1a, the turret block 16 has two faces, each with a mold core plate 37 mounted to it. Each mold core plate 37 may be mounted to a respective face of the turret block 16 using any suitable conventional means known in the art. In a preferred embodiment, each mold core plate 37 has a plurality of core pins 38, equal in number to the number of mold cavities 34 in the first mold half 32. As can be seen in FIG. 1a, a first set A of core pins 38 is aligned with the mold cavities 34 in a molding position, while a second set B of core pins 38 are in a cooling position located 180 degrees from the molding position.

After plastic material has been injected into the mold cavity spaces 40 and the molded parts 50 have been formed, the parts 50 are partially cooled in a customary manner by cooling circuits (not shown), such as water cooling circuits, in the mold cavity plate 32 and in the core pins 38. After partial cooling has occurred and the parts 50 have been sufficiently solidified to avoid part deformation, the mold is opened in the manner previously discussed and the molded parts 50 on the first set A of core pins 38 are withdrawn from the mold cavities 34. The turret block 16 is then rotated 180 degrees to present the second set B of core pins 38 for molding while the first set A of core pins 38, complete with the molded parts 50 thereon, are presented at the opposite side of the turret block for further cooling.

In accordance with a first embodiment of the present invention, a device 62 is provided to cool the molded parts and remove them from the core pins 38 when the molded parts are in the cooling position. The device 62 includes a frame 64 attached to the carrier 18 or its support. A cross beam 66 is attached to the frame 64 so as to be capable of rotation through a 90 degree angle. The end of the cross beam 66 remote from the frame 64 is connected to a drive means 68 for rotating the cross beam 66 through said 90 degree rotation. The drive means 68 may comprise any suitable drive means known in the art.

Figure 2A:
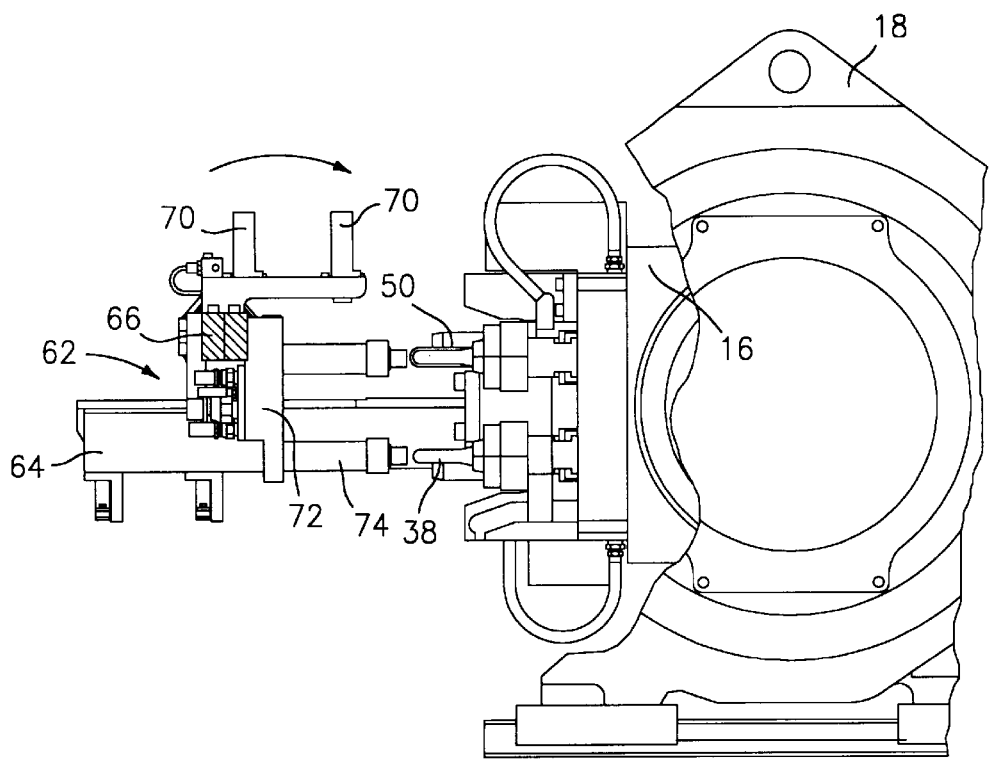
FIG. 2a is a side view of a first embodiment of a cooling device in accordance with the present invention.
Figure 2B:
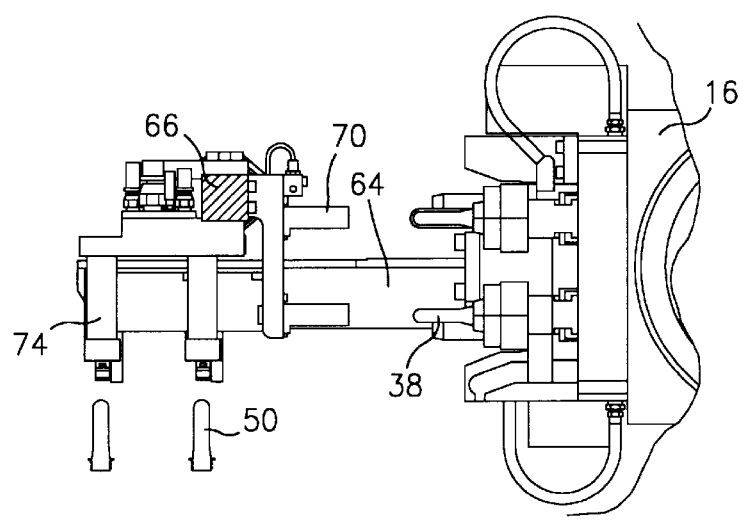
FIG. 2b is a side view of the cooling device of FIG. 2a showing the cooling tubes in a part removing position.

A set of blowing tubes 70 is mounted to a first surface of a head or carrier plate 72 attached to the cross beam 66. The blowing tubes 70 are used to direct a cooling fluid, typically air, toward an end of the molded parts 50, while the parts 50 are on the core pins 38. This blowing position is shown in FIG. 2b. Cooling fluid may be supplied to the blowing tubes 70 in suitable manner known in the art.

A set of cooling tubes 74 is mounted to a second surface of the head 72. As can be seen from FIG. 2b, the cooling tubes 74 are offset 90 degrees from the blowing tubes 70. The set of cooling tubes 74 are used to facilitate removal of the molded parts 50 from the core pins 38. The cooing tubes 74 assist the removal of the molded parts 50 through the application of a vacuum inside the tubes 74 in a known fashion. For example, a port (not shown) in the bottom of each tube 74 may be connected to a vacuum source (not shown). The tubes 74 may be cooled by a fluid, such as chilled water, and remove heat from the parts 50 positioned therein either by convection or conduction. For example, cooling may be achieved by intimate contact between exterior surface of the part and the inside surface of the tube as taught by U.S. Pat. No. 4,729,732, which is incorporated by reference herein.

Figure 3:
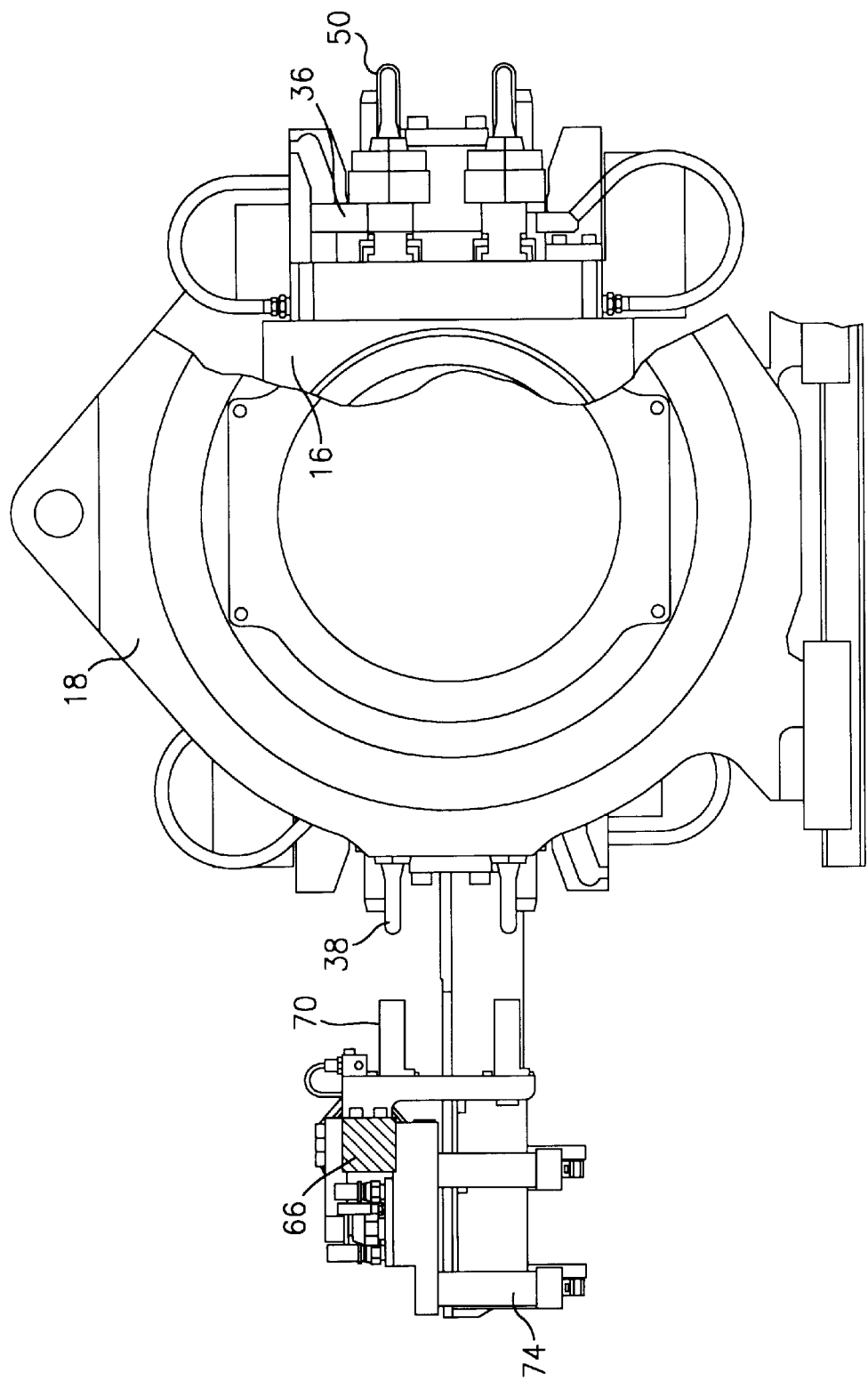
Figure 4:
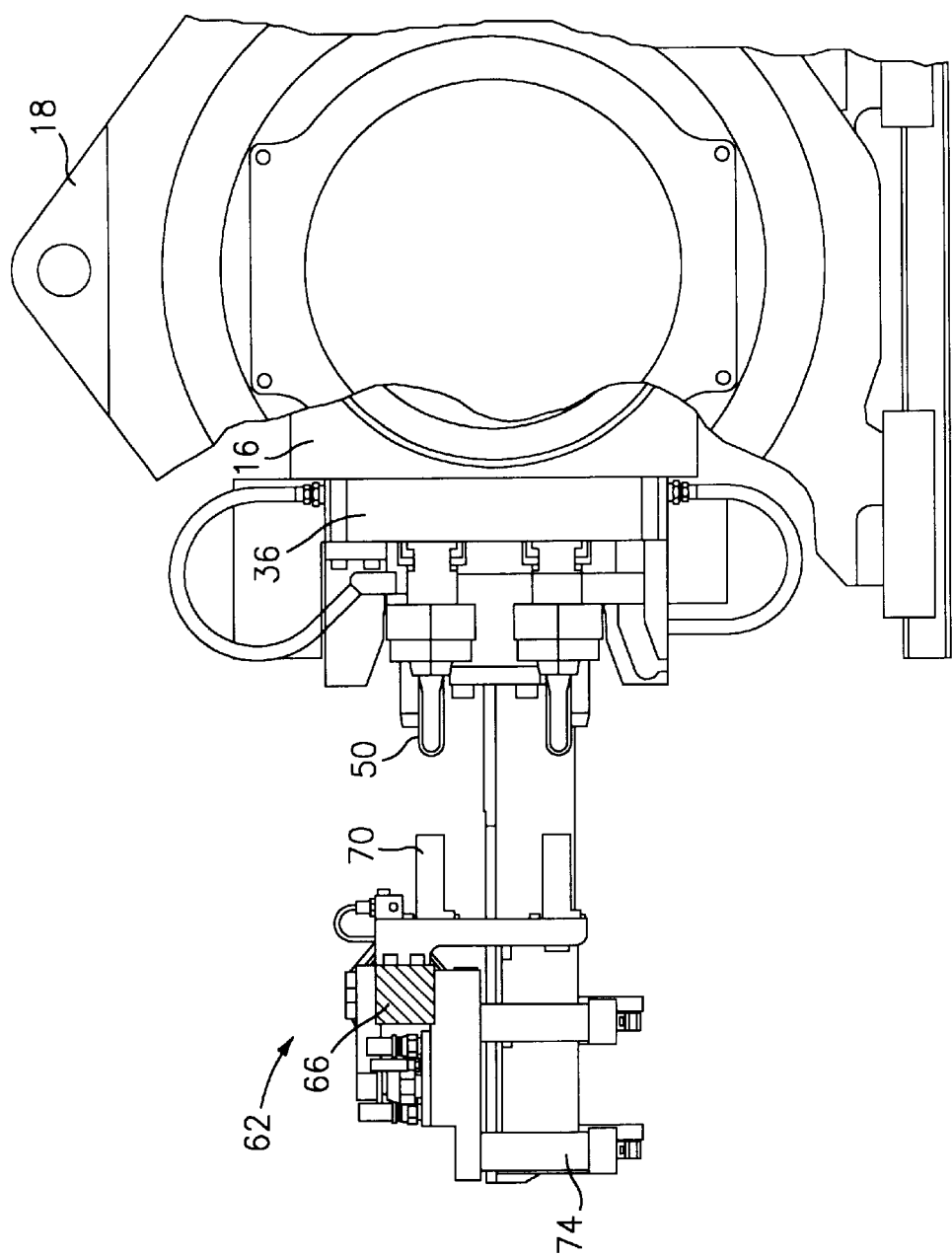
Figure 5:
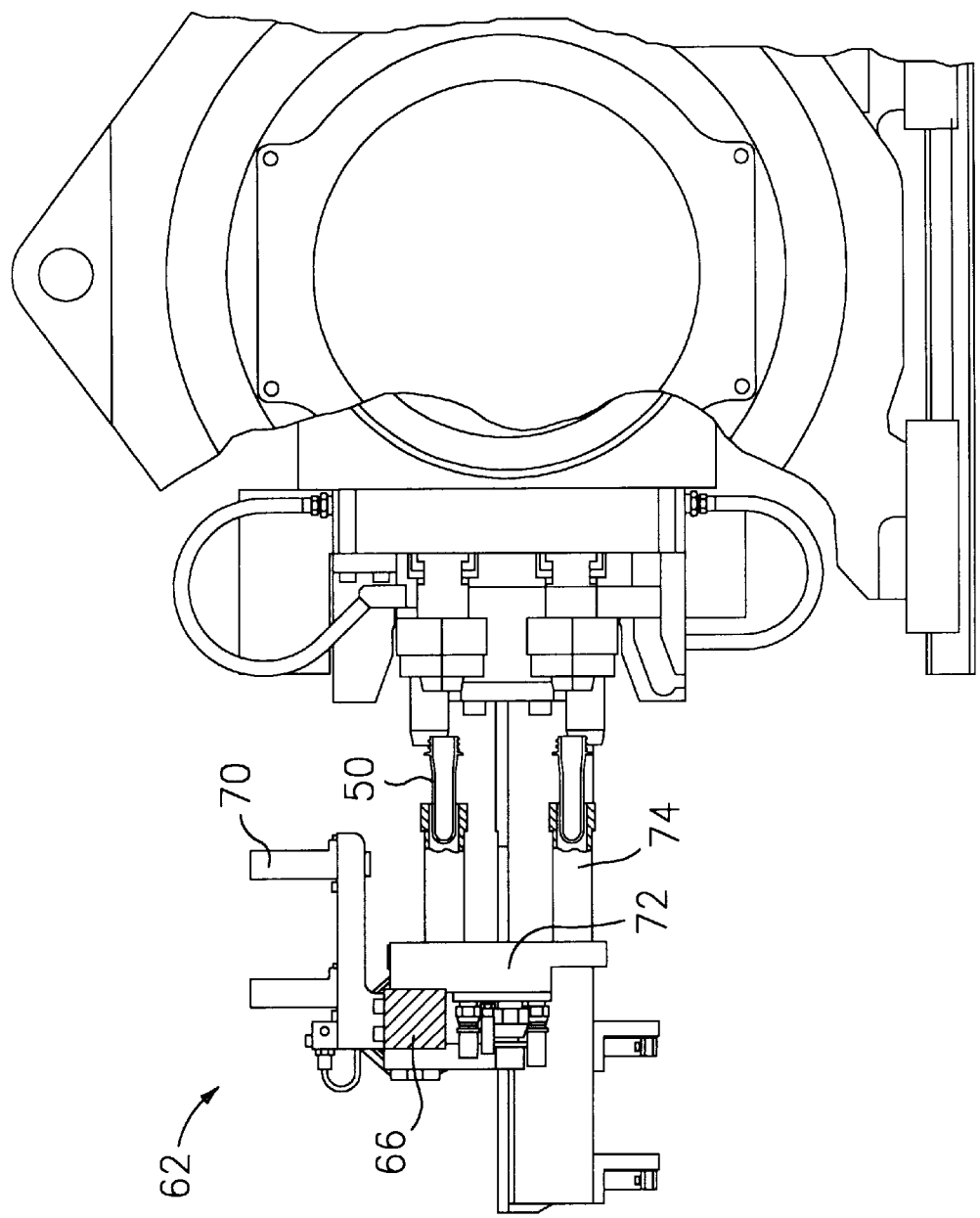
FIG. 5 is a partial sectional view of the molding machine of FIG. 1a in a part transferring mode.
Figure 6:
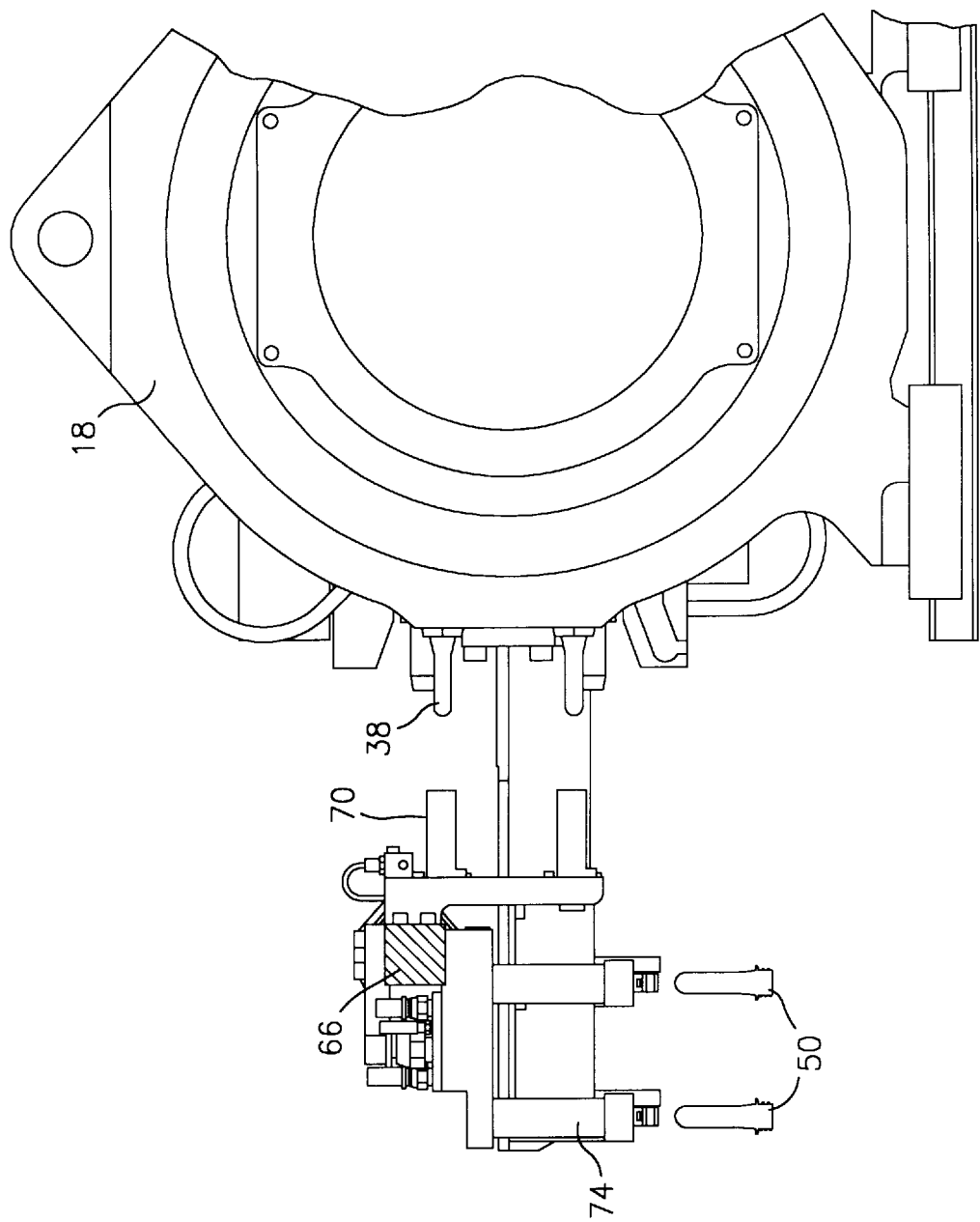
FIG. 6 is a partial sectional view of the molding machine of FIG. 1a with the cooling device ejecting cooled molded parts.

FIGS. 3–6 illustrate the sequence of operation of a molding machine in accordance with the present invention. FIG. 3 shows the clamp closed and the parts 50 being molded on the first core set A. FIG. 4 shows the clamp closed for molding on the second core set B while cooling air is being directed from tubes 70 onto the ends of the molded parts 50 on the first core set A. FIG. 5 shows the cross beam 66 rotated 90 degrees to align the cooling tubes 74 with the parts 50 on the first core set A as the parts are ejected into the tubes 74. Ejection of the molded parts 50 from the core pins 38 into tubes 74 is carried out by the provision of ejection means, such as ejection pins/sleeves or an ejection plate, on each mold face 36. FIG. 6 shows cross beam 66 rotated 90 degrees in the reverse direction to once again align the blowing tubes 70 with the next set of molded parts while the previous set of parts are ejected from cooling tubes 74. Ejection of the cooled parts 50 from the cooling tubes 74 may be effected by discontinuing the vacuum and allowing gravity to cause the parts to drop out of the tubes 74 or by blowing the parts 50 out of the tubes 74 or by mechanical ejection means such as those shown in U.S. Pat. No. 5,447,426, which is incorporated by reference herein.

Figure 7:
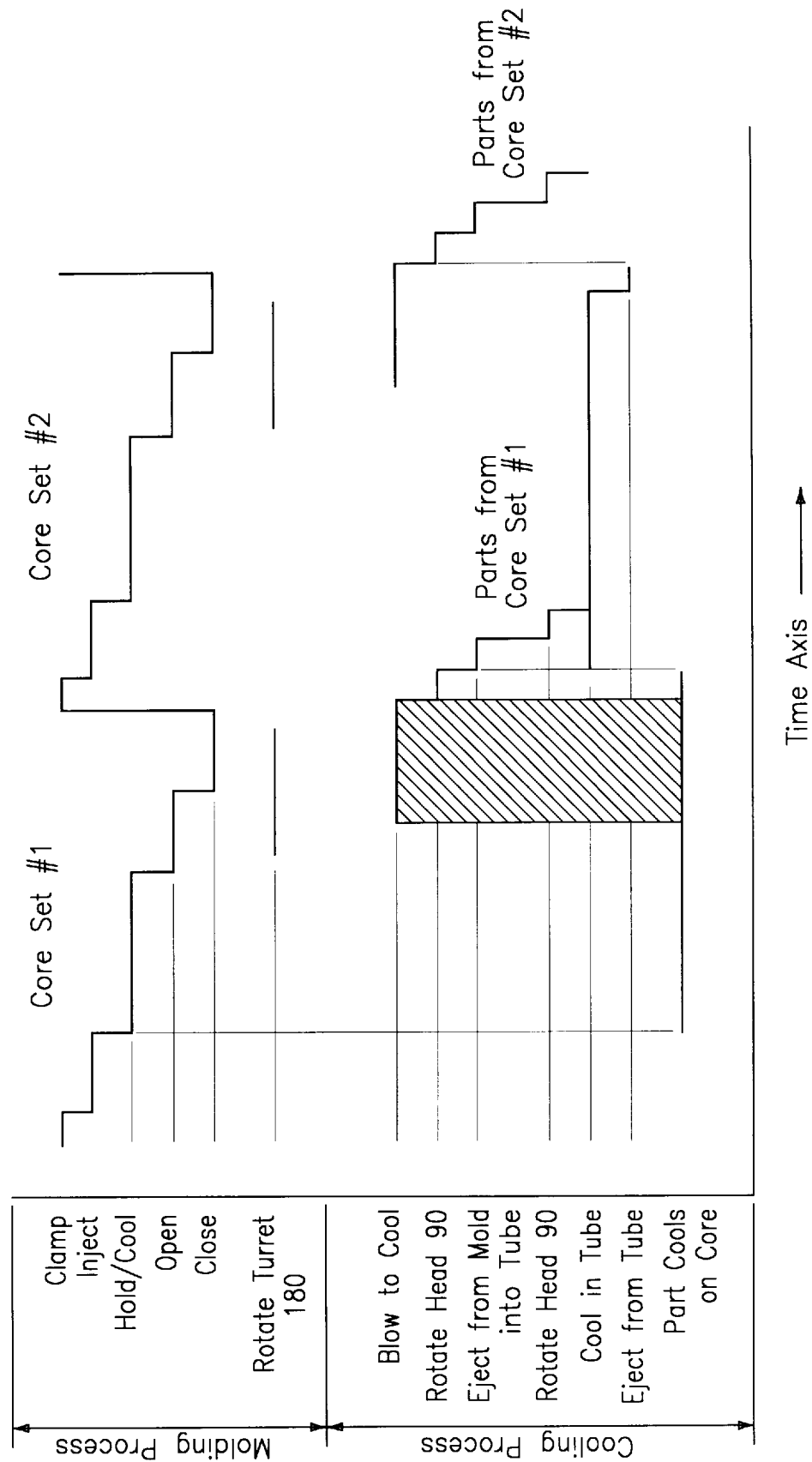

FIG. 7 shows the sequence of operation for making the molded parts 50. The top half of the chart shows the molding process and indicates two identical sequences spaced in time, the first for the first core set A, and the second for the second core set B. Each of the sequences starts with the mold closed, as shown in FIG. 1a. The injection molding sequence of clamp, inject, hold/cool, and open then follows. During the mold opening stroke, the index turret block 16 simultaneously begins to rotate 180 degrees to align the second core set for molding while the first core set, with the molded parts 50 on the core pins 38, is aligned to the cooling and removal device 62. The rotation is completed during the closing stroke of the turret block 16.

The bottom half of the chart shows the cooling process and indicates a sequence that overlaps the two molding processes shown in the top half of the chart. The ejection and cooling sequence begins as the first core set A with molded parts 50 thereon is aligned to the cooling and removal device 62. Cooling fluid, typically compressed air, is blown from tubes 70 directly onto the ends of the molded parts 50, as they remain cooling on the core pins 38. Thus, during this portion of the sequence, parts 50 are cooled both internally and externally. Then the head 72 is rotated 90 degrees to align the cooling tubes 74 with the molded parts 50 on the core pins 38. Next the ejection system of the mold in combination with the vacuum circuit in the cooling tubes 74 transfers the parts from the core pins 38 to the tubes 74 wherein the parts are immediately cooled on their outer surfaces by their contact with the water cooled tubes, in a known fashion. The device 62 is immediately rotated again so that the tubes 74 point downward and the molded parts 50 continue cooling in a vertical orientation to ensure symmetrical cooling and gravitational effects maintaining a distortion-free part. The molded parts 50 are held in the tubes 74 by the applied vacuum and continue to cool until just before it is time to rotate the device 62 back to receive the next set of molded parts from the second core set B. Thus, the cooling time for the complete process optimizes the time the molded parts 50 are cooled, first while in the mold and on the cores and secondly while in the cooling tubes 74. Additional cooling is provided by the air blowing from tubes 70 onto the parts 50 during the shaded portion shown on the chart.

By maximizing the cooling time of the molded parts 50 as described hereinabove, it has been found that only two core sets are required for an optimum molding cycle. Thus the tooling cost for equipping a four faced turret block can be significantly reduced by using only a two faced turret block. The cost of the core sets is halved.

As can be seen from the foregoing discussion, there has been provided in accordance with the present invention a lightweight cooling and part removal device mounted on the moving index carrier that first cools the outside of the part 50 by blowing air and subsequently continues to cool the part 50 inside a cooled tube 74 that also removes the part 50 from the mold. Still further, cooling of the part 50 is performed in a vertical orientation inside a cooled tube 74. As a result, the part 50 has improved properties which are beneficial. Using the device of the present invention, time in this vertical orientation is optimized.

Figure 2C:
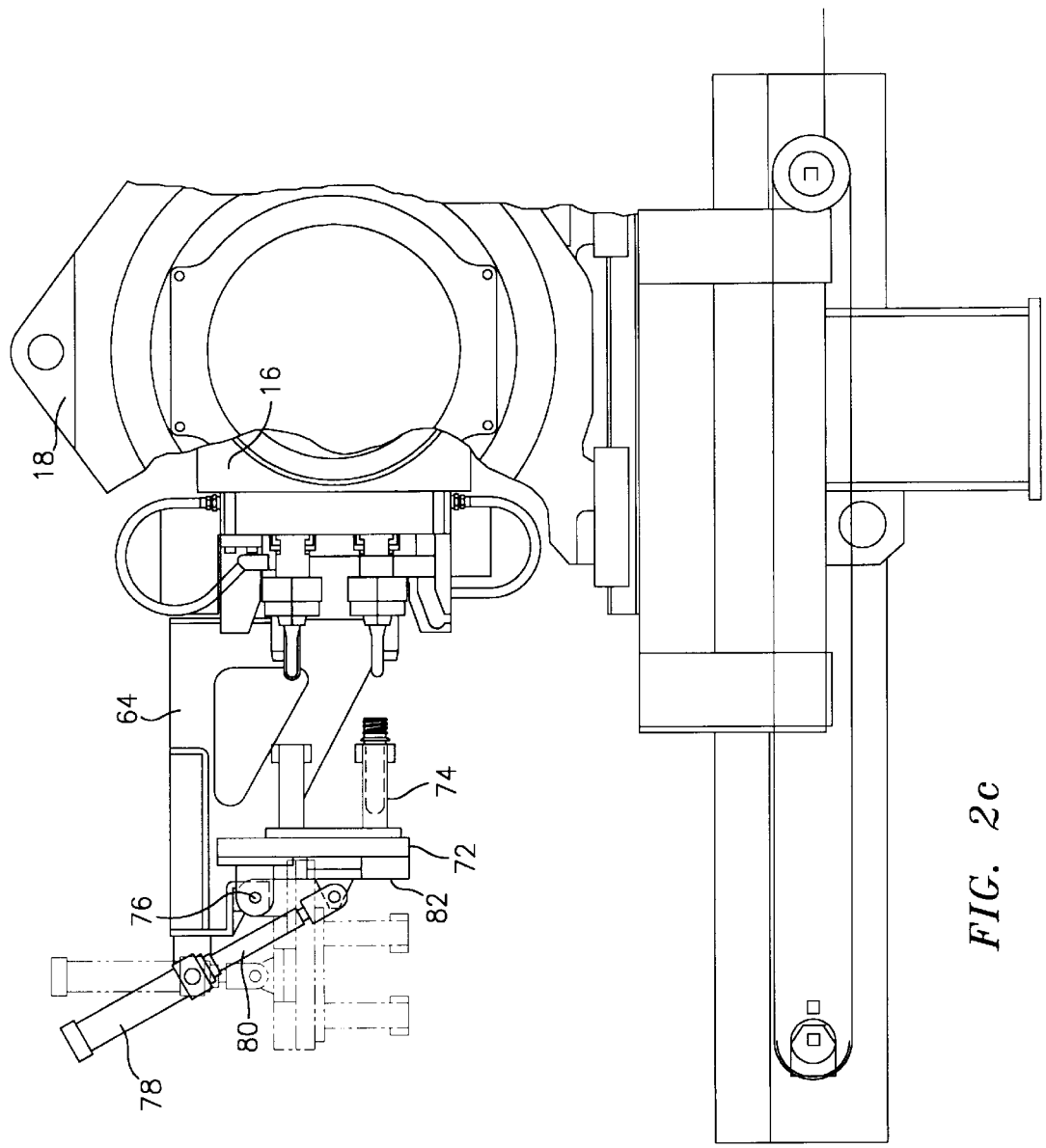
FIG. 2c illustrates an alternative actuation system for moving the cooling device of FIG. 2a between positions.

Referring now to FIG. 2c, an alternative mechanism can be used to rotate a head 72 containing only cooling tubes 72. As shown in this figure, the head 72 may be attached to a frame 64 mounted to one of the carriers 18 by pin connection 76. Further, a piston-cylinder type of actuation unit 78 may be connected to the frame 64. The arm 80 of the actuation unit may be connected to a rear portion 82 of the head 72. As shown in FIG. 2c, the cooling tubes 74 are aligned with core pins 38 and are removing molded articles therefrom. To rotate the head 72 and move the cooling tubes 74 to a vertical orientation, the actuation unit 78 retracts arm 80 and assumes the substantially vertical position shown in dotted lines in the figure.

Referring now to FIGS. 8a and 8b, a second embodiment of the cooling device of the present invention is illustrated. In this embodiment, blowing tubes 70 have been omitted. Instead, the cooling device 62' has additional cooling tubes 74 so that multi-position cooling can be effected in a manner similar to that illustrated in U.S. Reissue Pat. No. 33,237, which is incorporated by reference herein.

As shown in FIG. 8a, the device 62' is mounted in position III on the index machine turret carriage 18. The device 62' has a single side frame 84 mounted to one of the carriers 18 which contains a cam track profile 86. The profile 86 is followed by a cam follower 88 mounted to a movable carrier plate 90 on which are mounted multiple cooling tubes 74. In a preferred embodiment, the number of cooling tubes 74 on the carrier plate 90 is twice the number of core pins 38 on each face of the turret block 16. By providing this number of cooling tubes 74, the molded parts can be held within the cooling tubes 74 for successive molding cycles, thus extending the cooling times which can be achieved.

An actuator 92 is mounted to the side frame 84 and has a journaled connection 94 with the carrier plate 90 such that when the actuator's rod 96 is extended the carrier plate 90, following the cam track profile 86, is first translated to move the carrier plate 90 in a vertical direction and then moved from the vertical plane orientation shown in FIG. 8a to the horizontal plane orientation shown in FIG. 8b. During translation, a first set of cooling tubes 74 holding molded parts is moved out of alignment with the core pins 38 and a fresh set of cooling tubes 74 is presented to receive the next set of molded parts. When the carrier plate 90 is in the position shown in FIG. 8b, the parts 50 can be cooled in a vertical orientation and ejected when ready onto the conveyor 98 below. The actuator 92 may comprise any suitable actuator known in the art such as piston-cylinder unit.

Figure 9A:
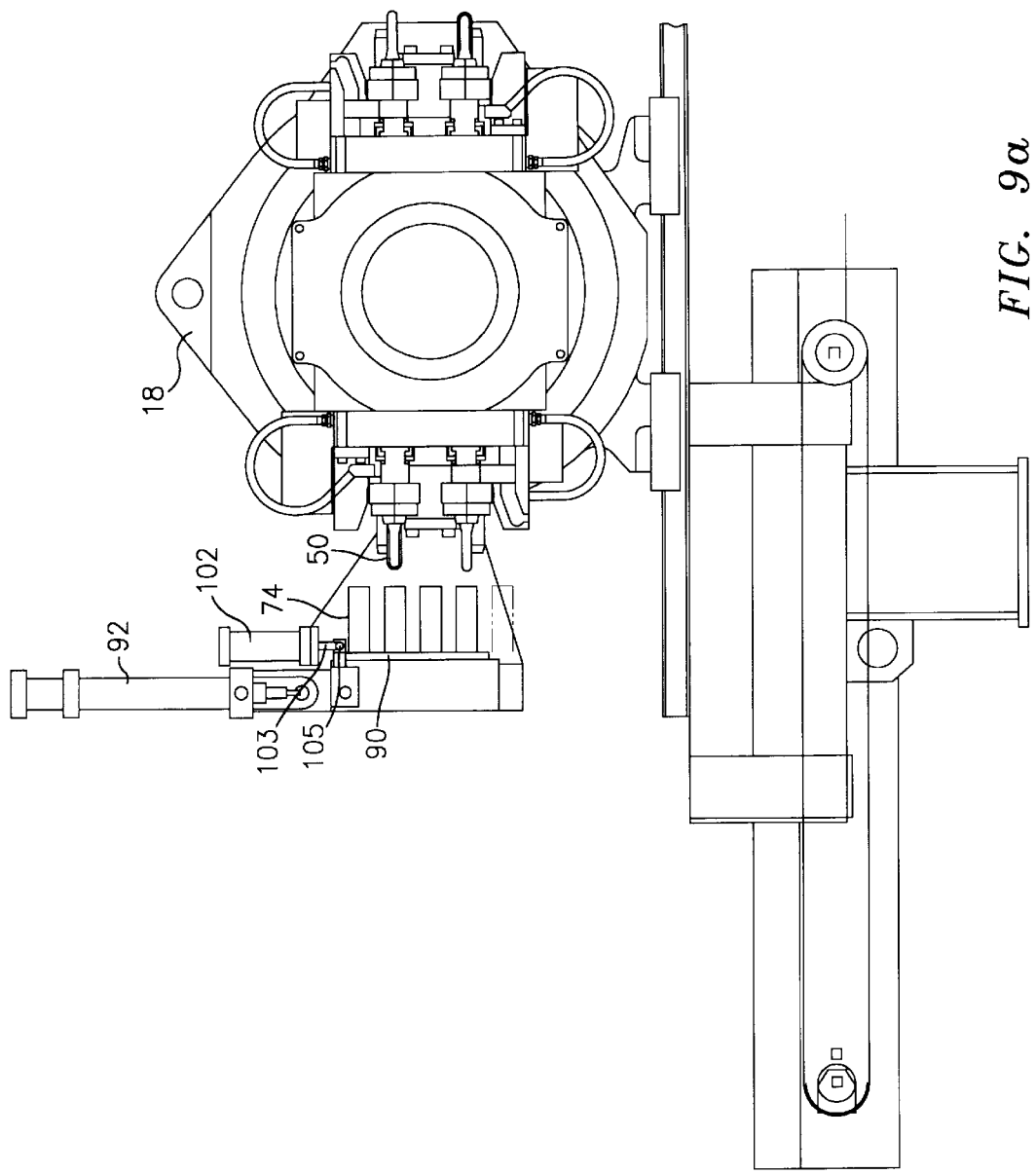
FIGS. 9a–9c illustrate an alternative actuation system for the cooling device of FIGS. 8a and 8b.
Figure 9C:
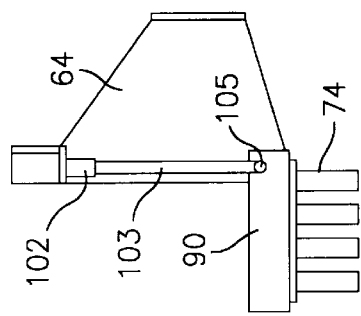
Figure 9B:
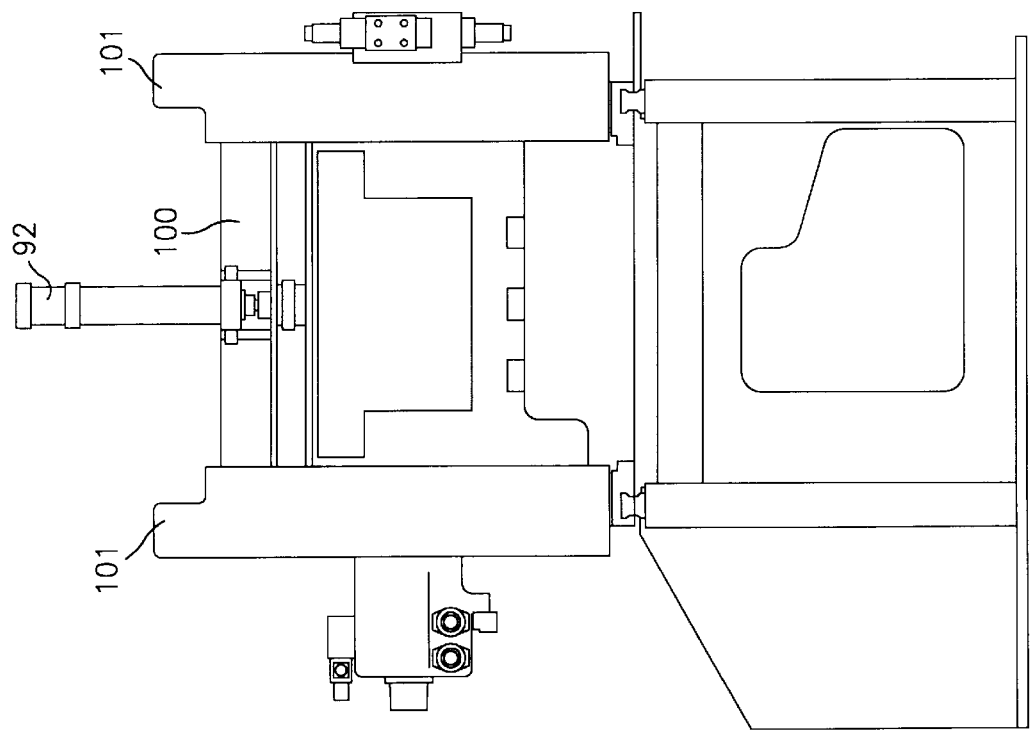

FIGS. 9a–9c illustrate an alternative actuation system for moving the cooling device 62' of FIG. 8a so that the carrier plate 90 moves from a vertical orientation to a horizontal orientation. In this embodiment, the actuator 92 is centrally mounted on a bridge 100 connecting support frames 102 on both sides of the machine 10. The actuator 92, in this arrangement, only effects the vertical positioning of the carrier plate 90. To effect rotation of the carrier plate 90 from the vertical position to the horizontal position shown in FIG. 9c, a separate actuator 102, preferably in the form of a piston-cylinder unit, is provided. The actuator 102 moves vertically with the carrier plate and when it reaches the end of its vertical travel, the actuator arm 103 is moved to rotate the carrier plate 90 about the pivot point 105 so that the parts 50 in the cooling tubes 74 is vertically oriented.

Figure 10B:
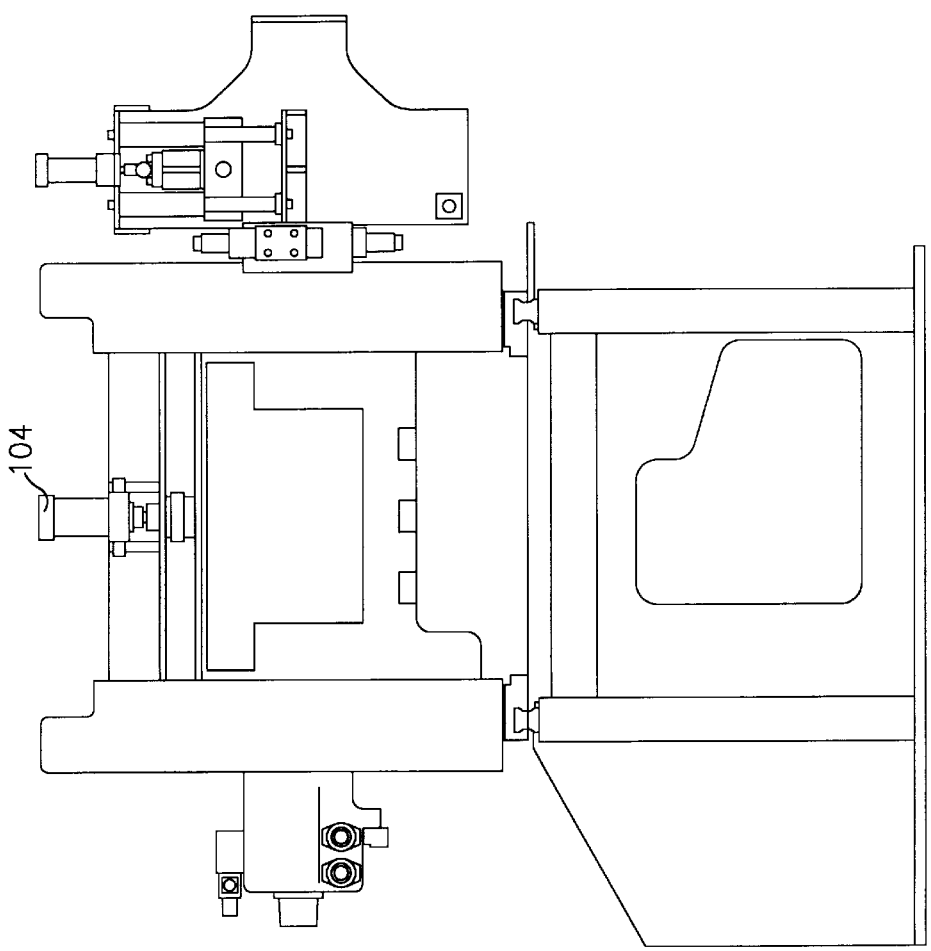
FIGS. 10a and 10b illustrate another alternative actuation system for the cooling device of FIGS. 8a and 8b.
Figure 10A:
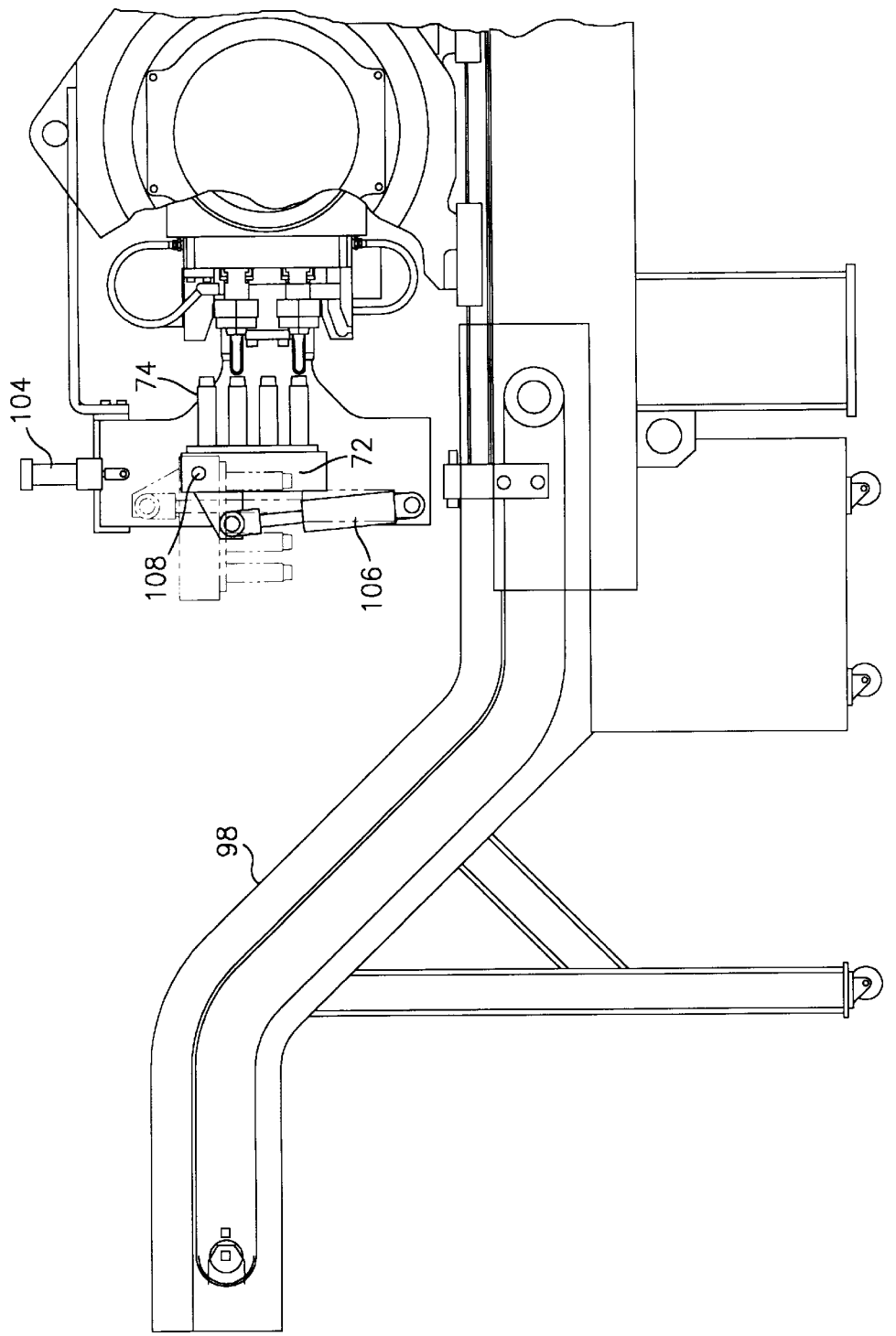

FIGS. 10a and 10b illustrate yet another embodiment of an actuation system for the cooling device 62'. In this arrangement, two cylinders 104 and 106 are used to translate and rotate the carrier plate. As shown in the figure, the carrier plate 72 containing the cooling tubes 74 is pivotally connected at pivot 108 to the frame 64 which is connected to a support structure on the machine 10. The actuator or cylinder 104 may be attached to carrier plate 72 in any suitable manner known in the art and is used to translate the carrier plate 72 with tubes 74 in a vertical direction. This translation may be carried out in any suitable manner known in the art. The actuator or cylinder 106 is connected to the carrier plate 72 and is used to rotate the carrier plate 72 about pivot point 108 so that tubes 74 assume a vertical orientation.

As can be seen from the foregoing discussion, there has been provided in the embodiments of FIGS. 8–10, a lightweight, multi-position cooling carrier plate arrangement for attachment to an index carrier that removes parts horizontally from the mold and cools and ejects them in a vertical orientation, while extending cooling time with multiple tubes.

It is apparent that there has been provided in accordance with the present invention a cooling device attached to an index machine which fully satisfies the objects, means and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for forming cooled molded parts comprising the steps of:

providing an index molding machine having a first platen carrying a first mold half having at least one mold cavity and a second platen comprising rotatable turret block means rotatable on a central axis of rotation for rotating at least two movable mold halves into alignment with said first mold half, each of said movable mold halves having at least one mold core;

moving said rotatable turret block means to bring a first one of said movable mold halves into a mold closed position with said first mold half and clamping said first one of said movable mold halves and said first mold half;

injecting molten material into said at least one mold cavity to form a first molded part set of at least one molded part;

holding said first one of said movable mold halves in said mold closed and clamped position while cooling said first molded part set;

moving said rotatable turret block means to a mold open position where said first molded part set is positioned on said at least one mold core on said first one of said movable mold halves;

rotating said turret block means to bring said first molded part set to a cooling position;

providing a cooling device on a carrier plate adjacent said cooling position, said cooling device having at least one cooling tube for receiving said at least one molded part forming said first set;

ejecting each said molded part forming said first set into said at least one cooling tube;

rotating said at least one cooling tube to a position where each said molded part in said first set is in a desired orientation; and cooling each said molded part in said first set while it is in said desired orientation.

2. The process according to claim 1, further comprising:

moving said rotatable turret block means to bring a second one of said movable mold halves into said mold closed position and clamping said second one of said movable mold halves to said first mold half;

injecting molten material into said at least one mold cavity to form a second molded part set comprising at least one molded part while said first molded part set is being cooled;

holding said second one of said movable mold halves in said mold closed and clamped position while cooling said second molded part set;

moving said rotatable turret block means to a mold open position where said second molded part set is positioned on said at least one mold core on said second one of said movable mold halves;

rotating said turret block means to bring said second molded part set to said cooling position;

ejecting said second molded part set into said at least one cooling tube;

rotating said at least one cooling tube to a position where each molded part in said second set is in said desired orientation; and cooling each said molded part in said second set while it is in said desired orientation.

3. The process according to claim 2, further comprising:

said cooling device including means for blowing air onto exterior surfaces of said molded parts;

prior to each said ejecting step blowing air onto each respective set of molded parts while said molded parts are on said mold cores on a respective one of said movable mold halves and thereafter rotating said carrier plate to bring said at least one cooling tube into alignment with said respective set of molded parts.

4. The process according to claim 3, wherein said carrier plate rotating step comprises rotating said carrier plate 90 degrees.

5. The process according to claim 3, wherein said step of rotating said at least one cooling tube to bring said molded parts being cooled into said desired orientation also causes said blowing means to be aligned with the next set of molded parts to be cooled.

6. The process according to claim 2, further comprising:
translating said carrier plate after said first molded part set ejection step to bring a second set of cooling tubes into alignment with said second set of molded parts to be cooled.

7. The process according to claim 2, wherein said desired orientation is a vertical orientation.

8. A cooling device for use with an index molding machine having a rotary turret block mounted within support means and at least one mold core on each of at least two faces of said rotary turret block, said cooling device comprising:
frame means attached to said rotary turret block support means;
means for receiving and cooling at least one molded part;
said receiving and cooling means being mounted to a first surface of a carrier plate connected to said frame means; and
means for moving said carrier plate between a first orientation where said receiving and cooling means is aligned with said at least one molded part and a second orientation where said at least one molded part is being cooled within said receiving and cooling means.

9. The cooling device according to claim 8, wherein said at least one molded part is vertically oriented while being cooled within said receiving and cooling means.

10. The cooling device of claim 8, wherein said receiving and cooling means comprises at least one-cooling tube for receiving said at least one molded part and for cooling same by placing an external surface of said at least one molded part in contact with an interior surface of said at least one cooling tube.

11. The cooling device of claim 10, wherein each said cooling tube has vacuum means for facilitating removal of a respective molded part from at least one mold core pin and for holding said respective molded part within said cooling tube.

12. The cooling device of claim 8, further comprising:
said carrier plate including two surfaces at right angles to each other; and
means for blowing cooling air onto exterior surfaces of said at least one molded part, said blowing means being mounted to a second one of said two surfaces.

13. The cooling device of claim 12, wherein said receiving and cooling means comprises at least one cooling tube mounted to said first surface, said at least one cooling tube being oriented substantially perpendicular to said blowing means.

14. The cooling device of claim 13, wherein said carrier plate is connected to a cross beam attached to said frame means and said moving means comprises means for rotating said cross beam through a rotation of 90 degrees.

15. The cooling device of claim 8, wherein said carrier plate is rotatably connected to said frame means and said moving means comprises an actuation unit mounted to said frame means and to a rear surface of said carrier plate for moving said carrier plate between said first and second orientations.

16. The cooling device of claim 8, wherein each of said faces has a number of mold cores for carrying molded parts from a molding position to a cooling position and wherein said receiving and cooling means comprises a number of cooling tubes for receiving and cooling said molded parts, the number of cooling tubes being at least twice the number of mold cores.

17. The cooling device of claim 8, further comprising:
said frame means containing a cam track profile; and
said carrier plate having a cat follower which engages with said cam track profile.

18. The cooling device of claim 17, wherein said moving means comprises an actuator unit attached to said carrier plate for causing said carrier plate to move along said cam track profile and move from said first orientation to said second orientation.

19. The cooling device of claim 8, further comprising:
said cooling and receiving means comprising a plurality of cooling tubes; and
means for extending the cooling of said at least one molded part, said extending means comprising first actuation means for translating said carrier plate while said carrier plate is in said first orientation between a first position where a first one of said cooling tubes is aligned with a first molded part on a first mold core on a first of said two faces in order to receive same for cooling and a second position where said first one of said cooling tubes is not aligned with any mold core and a second one of said cooling tubes is aligned with a mold core on a second of said two faces for receiving a second molded part.

20. The cooling device of claim 19, wherein said moving means comprises a second actuation means for rotating said carrier plate between said first orientation and said second orientation.

21. The cooling device of claim 20, further comprising said first and second actuation means being connected to said frame means.

22. An injection molding machine which comprises:
means for forming at least one molded part;
said forming means including a first platen carrying a first mold half having at least one mold cavity and a second platen in association with said first platen;
said second platen comprising turret block means for rotating at least two movable mold halves into alignment with said first mold half;
each of said movable mold halves having at least one mold core and being movable between a molding position where it is aligned with said first mold half and a cooling position where it is not aligned with said first mold half; and
means attached to said turret block means for cooling exterior surfaces of said at least one molded part on said at least one mold core of a first one of said movable mold halves after said first one of said movable mold halves has moved into said second cooling position, said cooling means being located externally of said turret block means.

23. An injection molding machine according to claim 22, further comprising:
means for moving said turret block means to bring said first one of said movable mold halves into a mold closed position and to thereafter move said first one of said movable mold halves to a mold open position with said at least one molded part residing on said at least one mold core on said first one of said movable mold halves; and means for rotating said turret block means to cause said first one of said movable mold halves to rotate from said mold open position to said second cooling position and to cause a second one of said movable mold halves to move to said first molding position.

24. The injection molding machine according to claim 23, wherein said rotating means causes said rotary turret block means to rotate 180 degrees to move said first one of said movable mold halves from said first molding position to said second cooling position.

25. An injection molding machine according to claim 23 further comprising:
means for injecting plastic material into each said mold cavity formed when one of said movable mold halves is brought into said mold closed position.

26. The injection molding machine according to claim 22, wherein said cooling means comprises:
at least one cooling tube mounted to a first surface of a carrier plate attached to said molding machine; and
means for rotating said carrier plate between a first position where said at least one cooling tube is aligned with said at least one molded part on said first one of said movable mold halves and a second position wherein said at least one molded part is resident in said at least one cooling tube and is oriented vertically.

27. The injection molding machine according to claim 26, wherein each said cooling tube cools a respective molded part by contact between exterior surfaces of said molded part and interior surfaces of said cooling tube and has vacuum means for holding said respective molded part within said cooling tube.

28. The injection molding machine according to claim 26, wherein said movable mold half includes means for ejecting said at least one molded part into said at least one cooling tube.

29. The injection molding machine according to claim 26, wherein said cooling device further includes means for blowing a cooling fluid onto exterior surfaces of said at least one molded part and said blowing means being mounted to a second surface of said carrier plate, said second surface being substantially perpendicular to said first surface.

30. The injection molding machine according to claim 29, further comprising said carrier plate being mounted to a rotatable cross beam connected to said injection molding machine and said rotating means comprising means for rotating said cross beam through a 90 degree angle of rotation.

31. The injection molding machine according to claim 26, wherein said cooling device comprises at least twice as many cooling tubes as molded parts.

32. The injection molding machine according to claim 26, wherein said cooling device further comprises:
a frame having a cam track profile attached to said machine;
a cam follower on said carrier plate for cooperating with said cam track profile; and
said rotating means comprising an actuation unit attached to said carrier plate for causing said carrier plate to move along said cam track profile.

33. The injection molding machine according to claim 32, wherein said actuation unit translates said carrier plate between a first position where a first cooling tube receives a first molded part from said first one of said movable mold halves and a second position where a second cooling tube receives a second molded part from the second one of said movable mold halves while said first molded part is being cooled within said first cooling tube.

34. The injection molding machine according to claim 26, wherein said cooling device further comprises:
means for translating said carrier plate between a first position where a first cooling tube receives a first molded part from said first one of said movable mold halves and a second position where a second cooling tube receives a second molded part from the second one of said movable mold halves while said first molded part is being cooled within said first cooling tube.

35. The injection molding machine according to claim 26, wherein said translating means comprises a first actuation unit connected to a support structure attached to said machine and said rotating means comprises a second actuation unit attached to said support structure.

36. An injection molding machine according to claim 22, wherein said cooling means is spaced from said turret block means.

37. A device for use with an injection molding machine having mold halves on a rotary turret block, said device transferring and cooling at least one molded part and comprising:
a member having a first surface and a second surface;
means for receiving and holding said at least one molded part positioned on said first surface; and
means connected to said second surface for engaging means for moving said member between a plurality of orientations including an orientation where said at least one molded part is held in a substantially vertical position.

38. A device according to claim 37, wherein said receiving means comprises at least one receiving tube positioned on said first surface.

39. A device according to claim 38, wherein said receiving means comprises a plurality of receiving tubes and wherein the number of receiving tubes equals the number of molded parts being transferred.

40. A device according to claim 38, wherein said receiving means comprises a plurality of receiving tubes and wherein the number of receiving tubes is a multiple of the number of molded parts being transferred so as to allow multi-position cooling.

41. A device according to claim 38, wherein each said tube includes means for cooling an external surface of any molded part resident therein.

42. A device according to claim 37, further comprising means for blowing cooling air onto said at least one molded part while said at least one molded part is resident on one of said mold halves, said cool air blowing means being positioned on a third surface, which third surface is at a right angle with said first surface.

43. A device according to claim 42, wherein said cooling air blowing means comprises at least one blowing tube mounted to said third surface.

44. A device according to claim 37, wherein said member comprises a plate which is movable between a first orientation and said orientation where said at least one molded part is held in a substantially vertical position.

45. A device according to claim 37, wherein said engaging means comprises means for connecting said member to a rotatable cross beam for moving said member between said plurality of orientations.

46. A device according to claim 37, wherein said engaging means comprises means for rotatably connecting said member to a frame and means for connecting said member to an actuation unit for moving said member between said plurality of orientations.

47. A device according to claim 37, wherein said engaging means comprises means for connecting said member to an actuation unit and a cam follower attached to said second surface for engaging a cam track.

48. A device according to claim 37, wherein said engaging means comprises means for connecting said member to an actuation unit for moving said member between said plurality of orientations.

* * * * *